United States Patent [19]

Pepin et al.

[11] Patent Number: 5,296,705
[45] Date of Patent: Mar. 22, 1994

[54] IMAGING SYSTEM WITH INTEGRATED MEASURING OF THE WEAR OF ITS OPTICAL ELEMENTS WORKING IN TRANSMISSION MODE AND OPTRONIC IMAGING EQUIPMENT COMPRISING AN IMAGING SYSTEM SUCH AS THIS

[75] Inventors: Christian Pepin, Gif sur Yvette; Jean-Louis Bourgain, Issy les Moulineaux, both of France

[73] Assignee: Thomson-CSF, Puteaux, France

[21] Appl. No.: 916,616

[22] Filed: Jul. 22, 1992

[30] Foreign Application Priority Data

Jul. 23, 1991 [FR] France .................. 91 09276

[51] Int. Cl.$^5$ .......................................... G01D 18/00
[52] U.S. Cl. ................... 250/338.1; 250/252.1; 250/330; 356/124.5
[58] Field of Search .............. 356/124.5, 239; 250/252.1 A, 338.1, 330

[56] References Cited

U.S. PATENT DOCUMENTS

| | | | |
|---|---|---|---|
| 438,028 | 10/1890 | Staff | 99/348 |
| 3,743,427 | 7/1973 | Weiser | 356/124.5 |
| 3,912,396 | 10/1975 | Hartmann | 356/124.5 |
| 3,974,331 | 8/1976 | Pepin | 358/211 |
| 4,110,046 | 8/1978 | Baker et al. | 356/124 |
| 4,191,967 | 3/1980 | Dansac et al. | 358/113 |
| 4,363,034 | 12/1982 | Grancoin et al. | 358/213.13 |
| 4,380,028 | 4/1983 | Pepin et al. | 358/219 |
| 4,387,301 | 6/1983 | Wirick et al. | 250/252.1 |
| 4,404,592 | 9/1983 | Pepin et al. | 358/125 |
| 4,776,692 | 10/1988 | Kalawsky | 356/239 |
| 5,054,917 | 10/1991 | Pepin et al. | 356/152 |
| 5,071,226 | 12/1991 | Audion et al. | 359/832 |
| 5,102,065 | 4/1992 | Couderc et al. | 244/3.11 |
| 5,128,884 | 7/1992 | Prager | 364/571.03 |

FOREIGN PATENT DOCUMENTS

| | | |
|---|---|---|
| 3439578 | 6/1985 | Fed. Rep. of Germany . |
| 3429410 | 2/1986 | Fed. Rep. of Germany ... 250/252.1 A |
| 2134833 | 8/1972 | France . |
| 1381873 | 1/1975 | United Kingdom . |

OTHER PUBLICATIONS

Žaja, et al., "Modulation Transfer Function (MTF) Measurement of Thermal Imaging System from the Edge Response Function," *Optical Engineering*, vol. 22, No. 6, Nov. 1983, pp. 743-745.

Rosell, et al., "Measuring System Performance Characteristics of Infrared Systems (MRT, MTF, NETD) Using Automatic Test Equipment," *IEEE International Automatic Testing Conference*, vol. 1176, No. 89, Sep. 25, 1989, pp. 236-241.

Datta, et al., "Influence of Temperature on the MTF of Cascaded Image-Intensifier Tubes," *Applied Optics*, vol. 23, No. 12, Jun. 1984, pp. 1967-1971.

Patent Abstracts of Japan, vol. 7, No. 231 (P-229)(1376) Oct. 13, 1983 & JP-A-58 118 943 (Ricoh K.K.) Jul. 15, 1983.

Patent Abstracts of Japan, vol. 7, No. 15 (P-169)(1160) Jan. 21, 1983 & JP-A-57 172 222 (Ricoh K.K.) Oct. 23, 1982.

*Primary Examiner*—Constantine Hannaher
*Attorney, Agent, or Firm*—Pollock, VandeSande & Priddy

[57] ABSTRACT

An imaging system is provided with integrated measurement of wear in at least one of the system's optical elements working in the transmission mode, in a given spectral band. The system includes a combination of optical elements and an imaging detector on which there is projected the image of an observed scene by means of the optical elements which produces a video signal of the observed scene. An alarm is provided to signal the existence of an optical element having a degree of wear which exceeds a critical value.

6 Claims, 2 Drawing Sheets

IMAGING SYSTEM WITH INTEGRATED MEASURING OF THE WEAR OF ITS OPTICAL ELEMENTS WORKING IN TRANSMISSION MODE AND OPTRONIC IMAGING EQUIPMENT COMPRISING AN IMAGING SYSTEM SUCH AS THIS

BACKGROUND OF THE INVENTION

1. Field of the Invention

The invention relates to the field of the checking of the surface quality of optical elements and its object is an imaging system with integrated measurement of the wear of its optical elements working in transmission mode, notably domes or windows for the protection of airborne optronic instruments. The invention can be applied more particularly but not exclusively to the airborne optronic instruments comprising an imaging system such as this.

An imaging system comprises a combination of optical elements, working in transmission and reflection modes, and an imaging detector. The combination of optical elements projects an image of the scene observed in the sighting direction on the imaging detector, and the imaging detector gives a video signal by which this scene can be displayed on a monitor.

In the context of the main application envisaged, it may be recalled that an optronic instrument placed on board an aircraft is constituted conventionally by an imaging system and a sighting head that is movable in relative bearing (and possibly in elevation) in order to orient the direction of the sighting line of the imaging system.

The sighting head houses a sighting line deflection mirror and has a dome or window to shield and isolate the delicate elements of the imaging system from the external atmosphere. The window and the mirror form part of the optical combination of the imaging system for they play a role in the formation of the image projected on the imaging detector.

2. Description of the related art

The spectral band of operation of the equipment determines the choice of the material constituting the window. Unfortunately, the materials (ZnSe, Ge or ZnS) selected as a function of their possibility of optical transmission in the useful ranges of infrared transmission (3–5 $\mu$m and 8–12 $\mu$m) do not have special qualities of hardness and of surface condition. These materials stand up poorly to the stresses generated by flight at high speeds in a hostile environment, notably to pluvial erosion, and are then exposed to the phenomenon of wear and tear.

This wear and tear depends very substantially on particular flying conditions encountered during the various missions carried out. It therefore proves to be very difficult to make a priori plans for a periodicity of replacement of the window that would be adapted to all missions.

Thus, the replacement of the window should be governed not by its duration of use but by the determining of the starting point of time at which the wear becomes such that it reduces the performance characteristics of the optronic equipment, i.e. to the point of rendering its operational use impossible.

A visual examination of the surface condition of the window most usually leads to the premature conclusion that it is worn out and hence to its replacement, thus substantially increasing maintenance costs. Besides, an examination such as this can be made only on the ground.

SUMMARY OF THE INVENTION

In order to enable the implementation of a procedure for the simple and efficient maintenance of a window of an airborne optronic instrument or, more generally, any optical element of an imaging system working in transmission mode, the invention proposes an imaging system capable, independently and in flight as the case may be, of carrying out an objective measurement of the degree of wear of this optical element.

The invention makes use of the fact that the surface defects of a damaged transmission element prompt an effect of scattering of light. Furthermore, the erosion increases with the quantity of light scattered. The measurement of the quantity of light scattered therefore constitutes an objective measurement of the degree of wear of the window.

This measurement of the quantity of light scattered is deduced, in the invention, from the analysis of the image of a reference test pattern perceived by the imaging system through the window. This measurement is possible, in the application to onboard optronic systems, when the window to be evaluated is linked to the sighting line orientation device, thus enabling the window to be returned to a position in which it is possible to place the reference test pattern which will be seen through the window.

The light scattered by the surface defects then causes the degradation of the apparent contrast of the image and reduces the transmission of the light. The apparent degradation of contrast may be expressed by a video measurement of the type carried out for the preparation of the modulation transfer function (M.T.F.) of a given imaging system. Furthermore, the attenuation of the level of the video signal analyzed makes it possible to measure the transmission loss of the window.

More specifically, the invention proposes an imaging system with integrated measurement of wear in at least one of its optical elements working in transmission mode in a given spectral band, said system comprising a combination of optical elements and an imaging detector on which there is projected the image of the observed scene by means of the combination of optical elements to give a video signal of the observed scene, wherein said system comprises:

means to generate a reference test pattern having a temperature difference defined with precision;

means for the servo-control of the temperature difference of the reference test pattern, designed to give the imaging detector a known reference modulation transfer rate to the imaging detector, irrespectively of the ambient temperature;

optical means which, in wear measurement mode, define an optical path designed to form an image of the reference test pattern on the imaging detector through the optical element to be checked;

means to measure the modulation transfer rate and the rate of transmission of light through the optical element to be controlled on the basis of the variation in the amplitude of the signal given by the imaging detector;

and alarm means designed to report the presence of an optical element, the degree of wear of which is greater than a critical value.

The invention proposes, notably, the use of this imaging system to enable the measurement of the degree of wear of its input element when it can be oriented, especially when it constitutes the input window of an on-board electronic instrument.

The invention does not call for the addition of a measuring system outside the optical head, for example a set of equipment placed before the window in the application to airborne optronic systems. The test thus made is an integrated test that can be made automatic whenever the instrument is put into operation or that can be performed in flight, if necessary, either at the operator's request or periodically, according to a pre-set or adjusted frequency.

BRIEF DESCRIPTION OF THE DRAWINGS

Other features and advantages of the invention shall appear hereinafter from the following detailed description, made with reference to the appended drawings of which, successively.

DESCRIPTION OF THE PREFERRED EMBODIMENT

Figure 1:
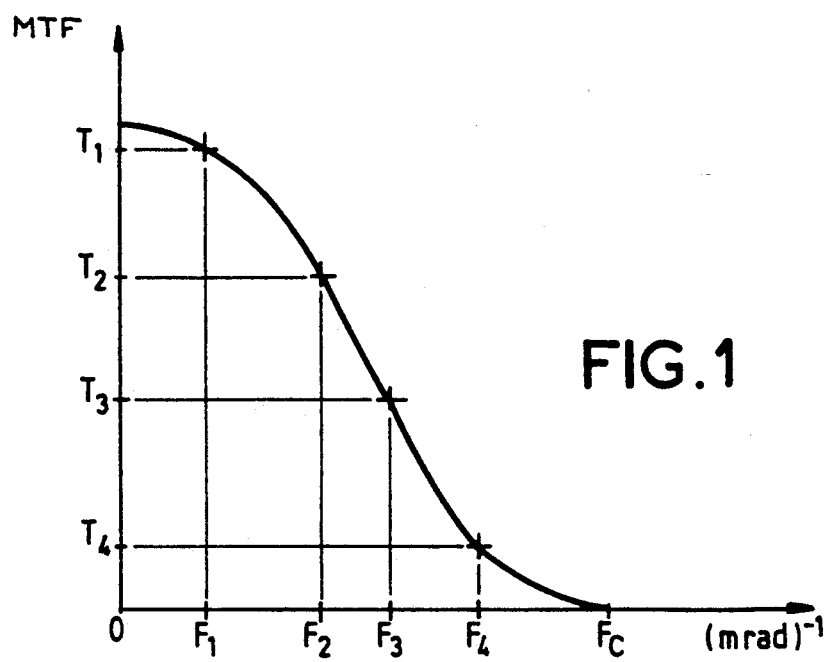
FIG. 1 is a graph showing the M.T.F. curve.

The modulation transfer function (M.T.F.) is a characteristic function of an imaging system. An example of an M.T.F. is shown in FIG. 1. This function gives the level of the image contrast obtained by this imaging system as a function of the spatial frequency, measured in $mrad^{-1}$ of an object with constant contrast. The heightwise variation on a line of the object scanned by the imaging system, called the rate of modulation of the video signal, measures the image contrast at the spatial frequency of the object analyzed. The M.T.F. of the imaging system may be established by the measurement of the different rates of modulation (T1, T2, T3, T4, ...) of the video signal given by this imaging system for different objects of different spatial frequencies, for example, for test patterns with lines having an increasing periodicity (F1, F2, F3, F4, ...).

The M.T.F. is originally standardized for the zero spatial frequency and decreases up to the value of the cutoff frequency $F_c$ for which the contrast is zero.

The invention uses this type of measurement of the rate of modulation in order to determine the degree of wear of a given optical element. The measurements of the modulation rate carried out with the optical element to be checked, placed between the test pattern and the imaging system, indicate the degree of wear of the optical element.

An exemplary embodiment of the imaging system according to the invention, more particularly suited to the measurement of a window of a sighting head of an airborne optronic instrument is described hereinafter with reference to FIGS. 2 and 3.

Figure 2:
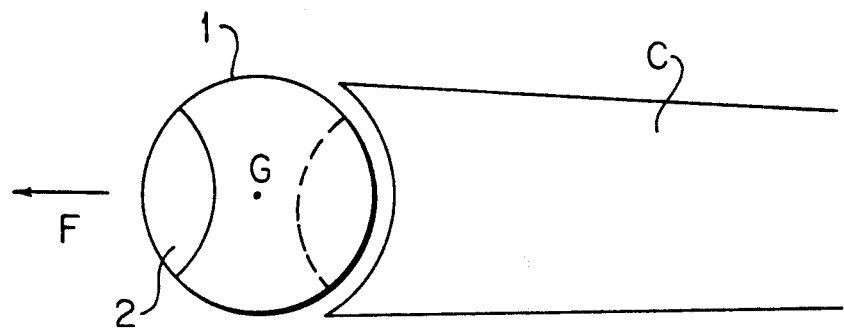
FIG. 2 shows a schematic top view of an optronic head with unlimited range of play in relative bearing.

FIG. 2 shows a schematic top view of an optronic sighting head 1 positioned before a fairing structure C designed to reduce the aerodynamic drag. The sighting head 1 is provided with a window 2 oriented, in the normal position, in the direction of flight, symbolized by the arrow F, of the aircraft. The sighting head 1 may pivot about an axis of rotation in relative bearing G. In the exemplary embodiment shown, the window 2 attains a position in which it is completely turned around, as shown in a top view by means of dashes in FIG. 2 and in a side view by means of solid lines in FIG. 3.

The invention makes use of this possibility of being turned around to enable the measurement of the degree of wear of a window of the sighting head of an optronic instrument.

Figure 3:
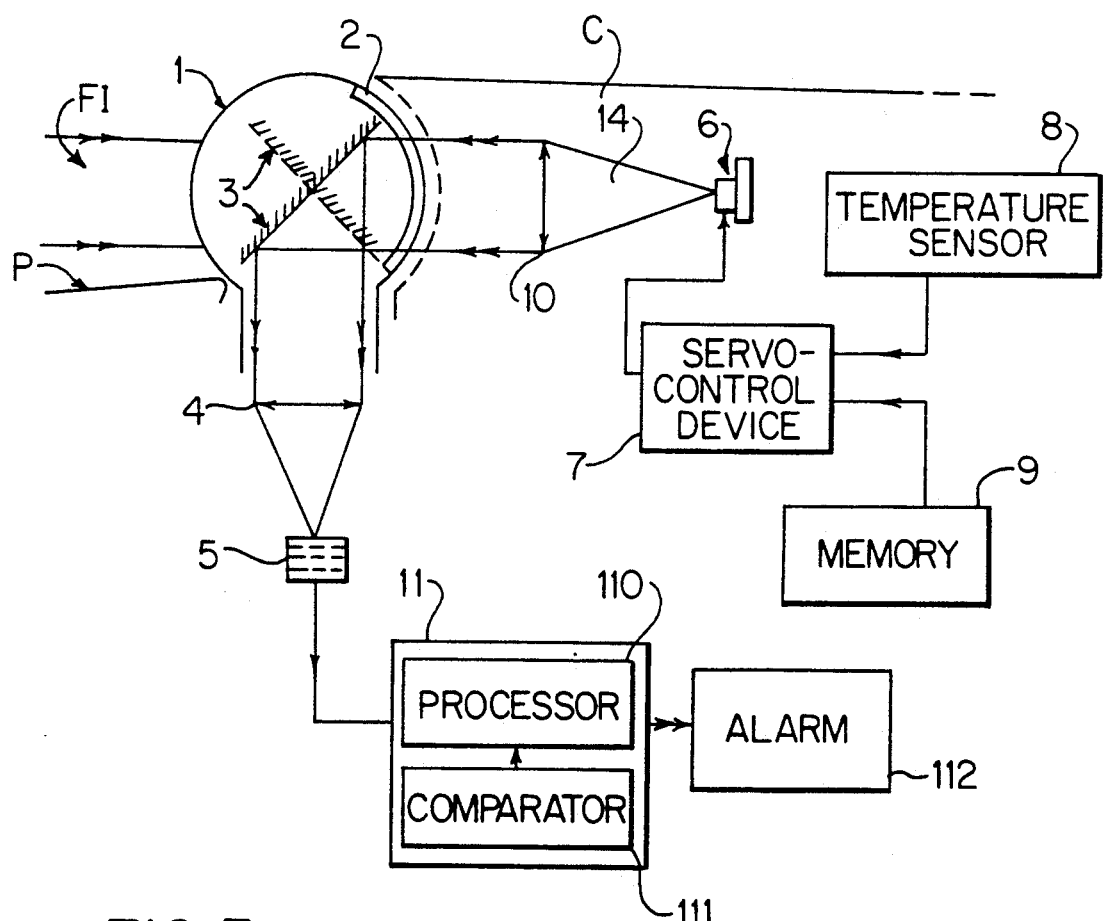
FIG. 3 shows a side view of an optronic head with unlimited range of play in relative bearing equipped with a measuring device according to the invention.

The side view shown in FIG. 3 gives a schematic view of the essential elements of an optronic instrument and of a standard imaging system for an instrument such as this. The sighting head 1 goes beyond the "skin" P of the aircraft and is encased by the fairing structure C. The imaging system comprises, in a simplified way, a deflection mirror 3 that rotates jointly with the sighting head, a focusing lens 4 and an imaging detector 5.

In imaging mode, an incident beam FI coming from the scene to be observed, is deflected by the mirror 3, the position of this mirror 3 being represented by dashes, and is focused by means of the lens 4 on the detector 5. When the detector 5 is an elementary detector or an array type detector, a scanning system (not shown) is necessary to encompass the entire scene to be projected. When the detector 5 is of the mosaic type, as in the example shown, namely a detector with detecting zones arranged in matrix form, there is no scanning system because the surface of the detector directly covers the image of the scene.

In window wear measuring mode, the mirror 3 is completely turned round, at the same time as the window 2, taking the position represented by solid lines.

FIG. 3 also shows the wear measuring elements of the imaging system according to the invention. Apart from the mirror 3, the lens 4 and the detector 5, these elements are: a heat source 6, one input of which is connected to the output of a temperature difference servo control device 7, the inputs of which are connected to an ambient temperature sensor 8 and to a reference memory 9; a collimation objective 10; a signal analysis device 11, the input of which receives the output signal from the detector 5 and the output of which is connected to an alarm 12.

The heat source 6, the structure of which is described in detail further below, notably comprises a bar test pattern. The difference in temperature between the bars and the rest of the pattern is defined with precision. This thermal difference is determined by the servo control device 7 as a function of the ambient temperature measured by the sensor 8. In the servo control operation, at a given reference level and for a reference window in good condition, the modulation transfer rate perceived by the imaging detector 5 is made constant irrespectively of the temperature. The servo control relationship is established by calibration at different ambient temperatures, the results of this calibration being stored in the memory 9 in the form of a reference table.

The light beam, coming from the heat source 6, is collimated by the objective 10 and then reflected by the mirror 3 before being projected on the detector 5 by means of the lens 4 in order to form an image of the test pattern. The detector 5 gives an output signal that is analyzed by the device 11. In the device 11, the analysis of the variations in amplitude of this output signal is performed for a line of the image of the test pattern projected on the detector 5. This analysis consists of measuring the value of the modulate transfer rate of the image perceived by the detector 5 through the window 2 considered.

Figure 4:
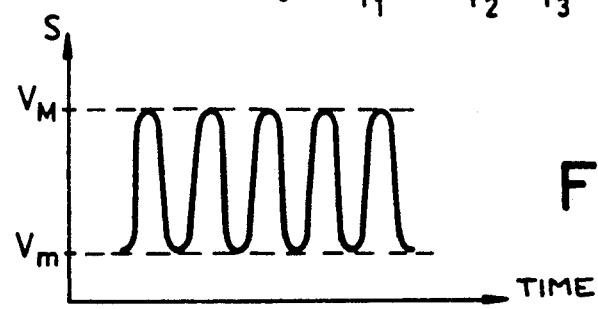
FIG. 4 shows a curve of variation of the signal of the imaging detector.

FIG. 4 shows an exemplary curve of variation, as a function of time, of the signal coming from the detector 5 for an image line. This curve, which may be displayed by any known means, conventionally takes the form of a sinusoid having a maximum amplitude value $V_M$ locating the level of the signal and a minimum amplitude value $V_m$. The ratio $T=(V_M-V_m)/(V_M+V_m)$ defines the rate of modulation and therefore directly measures the degree of wear of the window 2. Furthermore, the value $V_M$ of maximum amplitude of the signal gives the value of the rate of transmission t of the window if it is considered as a function of a value $V_o$ of maximum amplitude of the signal obtained with a window in good condition ($t=V_M/V_o$).

The analysis device 11, comprising a processor 110 and a comparator 111, integrates the values $V_M$, $V_m$ and $V_o$, computes T and t, and triggers the alarm 12 as the case may be after comparison of the values of T and t with threshold values To and to.

For a window in poor condition, the level of the signal at output of the detector is appreciably attenuated by the loss of transmission of a window such as this and, furthermore, the rate of modulation of the signal is diminished because of the scattering of light prompted by the presence of the damaged zones.

In order to determine the conditions of triggering of the alarm 12, the analysis device 11 compares the transmission rate value t and the modulation rate value T, obtained for the window examined, with threshold values of these rates. These critical threshold values are established, as a function of the ambient temperature, by means of an initial calibration on a reference window. This reference window is of the same type as the one being examined, and has a level of wear at the limit of what is tolerable in the sense that it substantially reduces the efficiency of the optronic instrument during a mission. When one of the characteristic values of the window under examination, T or t, reaches a critical value, the alarm triggers a signal which informs the user that the window has to be replaced.

Figure 5A:
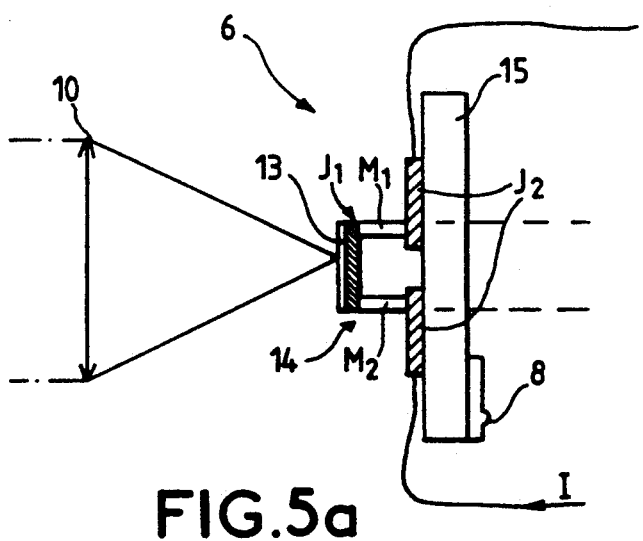
FIG. 5a shows the thermal source of the device according to the invention, making it possible to give a servo-controlled thermal difference.

As for the constitution of the heat source 6, an exemplary embodiment thereof is described here below with reference to FIG. 5a. This source 6 comprises the test bar pattern 13 which is positioned in the focal plane of the collimation objective 10 and is supported by a PELTIER effect device 14 which is itself fixed to a supporting plate 15 made of a material that is a good conductor of heat. The plate 15 is positioned against the ambient temperature sensor 8.

A PELTIER effect device is constituted by two thermo-electrical materials, M1 and M2, for example bismuth telluride with n and p type doping respectively, having different electrical thermal capacities. These two materials enable the definition of a stable thermal difference, as a function of a control current I, between copper junctions J1 and J2. The current I has the intensity corresponding to the temperature difference dictated by the servo control device 7.

Figure 5B:
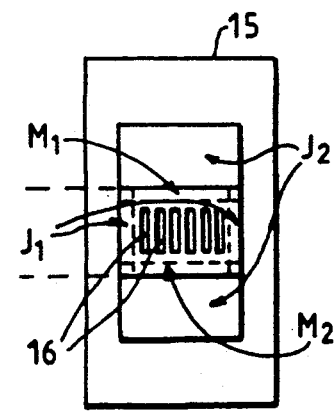
FIG. 5b shows a plane view of the test pattern of the measuring device according to the invention.

The plane view of the test pattern shown in FIG. 5b shows that the test pattern 13 is constituted by a thin metal plate bearing a pattern formed by bars at a high spatial frequency. These bars are formed by fine slits that are photo-etched in such a way that the supporting plate 15 is seen through these slits.

The PELTIER effect device 14 then makes it possible to establish a well-defined thermal difference between the test pattern 13, supported by the junction J1, and the background of the image constituted by the supporting plate 15 seen through the slits.

The invention is not restricted to the exemplary embodiment described and shown herein. In particular, those skilled in the art will be able to use test patterns having structures different from those described and will be able to match the material of the constituent elements to work in different infra-red bands (3-5 $\mu m$ or 8-12 $\mu m$). Furthermore, the field of application of the invention is not restricted to infra-red optronic instruments whether onboard or not: the invention can be applied, for example, to the television imaging cameras (in the visible and near infra-red frequency bands), by using a source with a constrast definition that is visible and no longer thermal or, more generally, to any light transmission optical element of a given optical system (such as a periscopic eye glass, scanner etc). In particular, in the case of complex optical systems, the invention can be applied to the localizing of defective optical elements.

What is claimed is:

1. An imaging system with integrated measurement of wear in at least one of its optical elements working in transmission mode in a given spectral band, said system including an input optical element, a combination of optical elements and an imaging detector on which there is projected, in imaging mode, an incident beam coming from an observed scene by means of the combination of optical elements, wherein said system comprises:

means to generate a reference test pattern having a temperature difference defined with precision;

means for the servo-control of the temperature difference of the reference test pattern, designed to give the imaging detector a known reference modulation transfer rate to the imaging detector, irrespectively of the ambient temperature;

optical means which, in wear measurement mode, define an optical path designed to form an image of the reference test pattern on the imaging detector through the optical element to be checked;

means to measure the modulation transfer rate and the rate of transmission of light through the optical element to be controlled on the basis of the variation in the amplitude of the signal given by the imaging detector;

and alarm means designed to report the presence of an optical element, the degree of wear of which is greater than a critical value.

2. An imaging system according to claim 1, wherein the means to generate the reference test pattern with a well defined thermal difference comprise a thermal source having a bar test pattern supported by a PELTIER effect device and wherein the means to measure the modulation transfer rate, T, and the transmission rate, t, from the variation in amplitude of the signal given by the detector include an analysis device comprising a processor and a comparator producing threshold values, To, to.

3. An imaging system according to claim 2, wherein the means for the servo control of the reference test pattern comprise a temperature difference servo control device coupled to a reference memory and to an ambient temperature sensor positioned against a supporting plate that is a good conductor of heat, and wherein the device applies a current, I, to the PELTIER effect device controlling a temperature difference between the bar test pattern and the supporting plate as a function of the ambient temperature and of the reference values of temperature difference memorized in the memory for different ambient temperatures, these reference values producing a servo control relationship dictating a known modulation transfer rate for an optical element in good condition.

4. An imaging system according to claim 3, wherein the input optical element is displaceable, the system further comprising means to displace the input optical element to bring this element, in wear measuring mode, onto the optical path designated to form the image of the reference test pattern on the detector and check the wear of the input optical element.

5. An imaging system according to claim 4, mounted in a television imaging instrument.

6. An optronic equipment comprising an imaging system according to claim 4, coupled to an orientable sighting head fitted out with an input window and a deflection mirror in order to orient the sighting line of the imaging system, wherein the input optical element to be checked is the protection window with which the sighting head is equipped, and wherein the thermal source is placed in a position such that, by the rotation of the optical head, the sighting line is oriented towards the thermal source so as to project the image of this source on the detector through the window.

* * * * *